(12) United States Patent
Nii

(10) Patent No.: US 7,209,893 B2
(45) Date of Patent: Apr. 24, 2007

(54) METHOD OF AND A SYSTEM FOR DISTRIBUTING ELECTRONIC CONTENT

(75) Inventor: Naoaki Nii, Higashikurume (JP)

(73) Assignee: Nokia Corporation, Espoo (FI)

( * ) Notice: Subject to any disclaimer, the term of this patent is extended or adjusted under 35 U.S.C. 154(b) by 420 days.

(21) Appl. No.: 09/725,713

(22) Filed: Nov. 30, 2000

(65) Prior Publication Data

US 2002/0065730 A1    May 30, 2002

(51) Int. Cl.
*G06Q 30/00* (2006.01)

(52) U.S. Cl. ............................ 705/26; 705/1; 235/379; 235/380; 235/381; 235/382; 380/230; 380/231; 380/232; 380/233; 380/234; 709/225; 713/185; 700/237

(58) Field of Classification Search .................. 705/25, 705/26, 27, 1; 713/185; 455/41.2; 700/237; 235/379–382; 380/230–234; 709/225
See application file for complete search history.

(56) References Cited

U.S. PATENT DOCUMENTS

| 4,528,643 | A | 7/1985 | Freeny, Jr. |
| 4,674,041 | A | 6/1987 | Lemon et al. |
| 5,734,719 | A | 3/1998 | Tsevdos et al. |
| 5,754,939 | A | 5/1998 | Herz et al. |
| 5,758,257 | A | 5/1998 | Herz et al. |
| 5,818,446 | A | 10/1998 | Bertram et al. |
| 5,857,175 | A | 1/1999 | Day et al. |
| 5,915,226 | A | 6/1999 | Martineau |
| 5,953,725 | A | 9/1999 | Eprahim et al. |
| 5,963,916 | A | 10/1999 | Kaplan |
| 6,032,130 | A | 2/2000 | Alloul et al. |
| 6,055,314 | A | 4/2000 | Spies et al. |
| 6,086,173 | A | 7/2000 | Restell |
| 6,298,441 | B1* | 10/2001 | Handelman et al. ........ 713/185 |
| 6,823,172 | B1* | 11/2004 | Forrest ...................... 455/41.2 |
| 2001/0047223 | A1* | 11/2001 | Metcalf et al. ............. 700/237 |

FOREIGN PATENT DOCUMENTS

| WO | 0018025 | 3/2000 |
| WO | 0030117 | 5/2000 |

OTHER PUBLICATIONS

U.S. Appl. No. 60/180490, filed Feb. 5, 2000, Dale Blackson.*

* cited by examiner

*Primary Examiner*—Yogesh C. Garg
(74) *Attorney, Agent, or Firm*—Banner & Witcoff, Ltd.

(57) ABSTRACT

A terminal device, a memory module and a system for and method of distributing electronic content. A content provider stores a number of multimedia files. A first integrated circuit card interface receives a host integrated circuit card containing first authorization information, and a second integrated circuit card interface receives a user integrated circuit card containing second authorization information. An input device permits selection of one or more multimedia files from the stored of multimedia files. A control unit is responsive to insertion into the second integrated circuit card interface of a user interface card containing second authorization information compatible with the first authorization information contained in a host integrated circuit card inserted in the first integrated circuit card interface to actuate an output device to provide the content of multimedia files selected by the input device. The content provider, control unit, input device, and output device might be a laptop computer, a wireless personal terminal, or a personal computer. The multimedia content delivery system might be provided in a kiosk in a public place, permitting a user to wirelessly download an electronic copy of the selected media to a laptop computer or wireless personal terminal.

23 Claims, 15 Drawing Sheets

FIG. 23
TRANSCEIVER LOCATION REGISTER

| TRANSCEIVERS | LOCATIONS | IC CARD ID |
|---|---|---|
| TRANSCEIVER NO. 1 | 281001CITY | 8139008877 |
| TRANSCEIVER NO. 2 | 281002CITY | 8134567888 |
| TRANSCEIVER NO. 3 | 281003CITY | 8134567733 |

FIG. 24
IC CARD MAINTENANCE AND VALIDITY REGISTER

| IC CARD ID | VALID | CONTENT | LOCATIONS | VALID | USAGE UNITS |
|---|---|---|---|---|---|
| 8139008877 | YES | AAA | 281001CITY | JAN 2000 | 50 |
| 8139008878 | NO | BBB | 281001CITY | JAN 2000 | 100 |
| 8139008879 | NO | CCC | 281001CITY | JAN 2000 | 100 |

FIG. 25
CONTENT DESCRIPTION AND AVAILABILITY DATABASE

| CONTENT ID | CONTENT DESCRIPTION | AVAILABILITY IN LOCATION | DRM | NUMBER OF USERS SUBSCRIBE |
|---|---|---|---|---|
| AAA | NEWS | ALL | DRM INC. | 500 |
| BBB | SHORT MOVIES | 281001CITY | WEB TV INC. | 40 |
| CCC | MUSIC | ALL | EUROVISION | 7500 |

METHOD OF AND A SYSTEM FOR DISTRIBUTING ELECTRONIC CONTENT

FIELD OF THE INVENTION

The present invention relates to a method and a system for distributing electronic content, to a terminal device, and to a memory module such as, but not limited to, a prepaid integrated circuit IC card, all in the field of the delivery of goods and/or services.

BACKGROUND OF THE INVENTION

The automatic distribution of multimedia content is becoming widely available. By way of example, publicly available terminals or kiosks are often provided in such locations as shopping malls and convenience stores to enable people to access audio or video material without the need for a sales representative. The person wishing to obtain such media can select from available media and receive the selected media in various forms, for example by means of load speakers or headphones or by means of a video screen or by downloading the media in electronic form. The person obtaining the media might be doing so simply for one time information or entertainment value. Alternatively, the person might desire to retain a magnetic recording of the media, permitting the person to have repeated access to the media.

In some applications, the media might be made available to the person desiring it at no charge. For example, a store selling musical compact disks might have kiosks at which selections from available compact disks can be sampled. Such a store might wish to limit the number of selections that any one customer can sample so as to prevent people from simply listening to numerous samples with no interest in purchasing any. A method must be provided to limit the number of samples which the customer can access. Alternatively, such a store might have kiosks at which for an appropriate charge the complete contents of a compact disk can be downloaded for duplication. In such event, a method must be provided to assure that the appropriate charge is paid.

In other situations, multimedia content might be made available to persons authorized to receive such content, but must be inaccessible by others. For example, kiosks might be provided in hotels or in airport terminals at which persons who are traveling can obtain access to e-mail that is intended for them, even though they do not have their own computer or other terminal device with them. Even if a person has a notebook computer or other terminal device accessible, the person may not have e-mail access from that device. In such cases, a secure manner must be provided to assure that e-mail can be accessed only by the correct recipient, and is not accessible by others. Similarly, multimedia content intended only for persons above a particular age might be accessible, but persons not authorized for receipt of such multimedia must not be able to access it. For example, a kiosk might be equipped to permit users to play video games, but some of the games might have content that makes it desirable to restrict access to those games to persons of at least some minimum age, such as 18, while permitting access to others of the games by all persons regardless of age.

A computer network might be accessed by a user who types in an identification and a password. After accessing the network, the person then must type in identifiers of files that he or she desires to access. All of this requires a user terminal equipped with appropriate input devices, such as a keyboard and/or a mouse, and requires manual typing or other selection by the user. An undesirable amount of time is required for such a procedure, particularly if the user makes an error in the typing or other selection. In addition, significant bandwidth is required for the communication link between the user and the desired file.

In the area of distribution of secured content, such as, movies, music, games, information and the like there has been a lot of development lately. There are two important issues, namely how distribution is handled, and how payments are handled. PCT Application WO 00/30117, the disclosure of which is incorporated herein by reference, describes a method of commercially distributing musical recordings comprising downloading a digital recording of music from a kiosk to a self-contained personal music terminal which stores the recording in an electronic memory and can play the music recording.

There is a need for short-range communication, like Bluetooth, in downloading data from access points. The present invention provides a way to take advantage of the convergence of the Internet and the Mobile Telecommunication or Mobile Computing fields on terminals that do not have any browsing capability. The Bluetooth standard is described in Bluetooth specification v.1.0B. One implementation of Bluetooth is described, for example, in PCT publication WO/0018025, the disclosure of which is incorporated herein by reference, in which a Bluetooth link between a Bluetooth enabled mobile terminal and a Bluetooth enabled data terminal, such as a PC, is disclosed.

Although the Internet is making a breakthrough in the mobile communication world thanks to the introduction of browsers on mobile terminals, it is expected that some alternative models for accessing the content/information of the Internet will be needed. Whereas the browser model is heavily based on user interaction, other models where the user can be more passive make particular sense in mobile environments because of potential limitations in the capabilities of some terminals, because of the lack of time for browsing, and further because of the importance of accessing information quickly rather than freely surfing among the various sources of information available. In this kind of context, a terminal having a passive mechanism would help the user in content downloading, and preferably keep aspects of a browser based content access model to keep flexibility in what content can be accessed.

The following summarizes some of the prior art systems for providing multimedia content to users:

Published PCT Application No. PCT/US99/20789 (International Publication No. WO 00/30117), the disclosure of which is incorporated herein by reference, shows a system for downloading music from a publically available terminal or kiosk to a self-contained personal music device for subsequent playback, with the kiosk being activated in response to insertion of a credit card or cash.

U.S. Pat. No. 5,734,719, the disclosure of which is also incorporated herein by reference, discloses a system for providing access at a retail site to a remote database to create a compact disk or a magnetic tape of a desired media, such as an audio or a video selection.

U.S. Pat. No. 5,963,916, the disclosure of which is also incorporated herein by reference, shows a similar system, with the user or customer being issued an integrated circuit ("IC") card which the customer uses to activate a kiosk from which the media is accessible.

U.S. Pat. No. 6,055,314, the disclosure of which is also incorporated herein by reference, concerns a system in which a customer is issued an IC card that includes a decryption key, allowing the customer to download a video selection that is associated with the particular decryption key.

U.S. Pat. No. 6,032,130, the disclosure of which is also incorporated herein by reference, discloses a kiosk which can be activated by a credit card to allow copying of media.

U.S. Pat. No. 5,728,257, the disclosure of which is also incorporated herein by reference, shows a system for making media available to customers in which the system captures information about each customers' selections and then uses that information to build a customer profile for each customer. When a previous customer returns, the system might suggest media which the customer's previous selections, as incorporated in the customer profile, indicate the customer might like.

SUMMARY OF THE INVENTION

The present invention is a system and process for delivering multimedia content in a convenient and economical, yet secure, manner. In accordance with one aspect of the present invention, a number of multimedia files are stored in a content provider. A first IC card interface receives a host IC card containing first authorization information. A second IC card interface receives a user IC card containing second authorization information. An input device is utilized to select a multimedia file from the stored multimedia files, and an output device is utilized to provide the content of a selected multimedia file. A control unit responds to insertion into the second IC card interface of a user IC card containing authorization information compatible with the authorization information of a host IC card inserted in the first IC card interface by causing the output device to provide the content of a multimedia file selected by the input device. The content provider might be a database at a kiosk which includes the host and user IC card interfaces. Alternatively, the content provider might be remote from the kiosk. Further, the content provider might be a personal computer, a notebook computer, a wireless personal terminal, or any other processor system having sufficient memory. The host IC card might be inserted into the host IC card interface each time access is desired, or it might be secured within the kiosk or other multimedia terminal.

According to another aspect of the invention there is provided a method of distributing electronic content to a terminal device, which method comprises transferring selected electronic content according to predetermined tailoring information, the tailoring information defining the electronic content to be transferred to the terminal device. The method includes storing the tailoring information on a memory module, which is separate from and releasably attachable to the terminal device, attaching the memory module to the terminal device, reading the tailoring information from the memory module to the terminal device, and transferring electronic content to the terminal device according to the tailoring information read from the memory module.

The present invention discloses a method to adjust and tailor the content that is being delivered through a broadcasting type of information access system. The invention enables portability of preferences or settings in order to allow the user to transfer from one terminal to another.

There is no need for browser software in the terminal for downloading purposes. So instead of surfing on the spot, the only active operation the user has to do is to insert a card, or information relating to the card, in the terminal. The terminal also has the capability of selecting content already downloaded in the terminal. The terminal may have means for surfing off-line within documents received. The browsing and surfing take a long time when searching, e.g. using search engines and trying to find pages the user is interested in, or even when surfing from a page to another to find the desired document when connected to the network.

In many cases the terminal user does not want to be active and browse. Therefore a process that is automatic and comfortable to use is needed. In order to achieve this the content still needs to be selected which is usually done by the user using a browser. It is proposed according to the invention that IC cards, as a preferred embodiment, be used for storing selection information, for example in the form of parameters such as tailoring parameters. The selection information preferably is stored on the IC card and entered in the terminal from the card.

According to an embodiment of the invention, the method comprises enabling a service for a terminal having an IC card inserted in the card reader, to provide access by the terminal to the services specified in the card, and transferring content to the terminal automatically.

Furthermore, according to the present invention, there is provided a step of subscribing to a service by transferring tailoring parameters, whereby on the basis of the subscription newly issued electronic content can be automatically transferred from an access point to the terminal, the new content containing such information that was not transmitted to the terminal device earlier.

Furthermore, having the IC card inserted in the terminal and an RF link between the access point and the terminal, the access point reads the tailorization parameters through the RF link. After the tailoring parameters have been transferred from the card to the terminal, an additional terminal can be utilised for control of the transferable data to the terminal, enabling also different terminals to be used by different card owners.

Furthermore, according to the present invention the transfer of tailoring parameters includes a time dependent subscription of the item. Each consumer may purchase the right to listen, read or view digital content for a certain period against a certain fee paid by the IC card. Then the automatic downloading in the access point for the specific content is available during that period. This enables also the service provider to control the number of users and to maintain statistics about the users, and also to make decisions about the supply and demand at specific access points. The access points which are controlled by a service provider would preferably be located in geographical locations known to the service provider. Use logs of every access point may be collected based on the geographical location of the access point.

Furthermore, according to an embodiment, a subscription of electronic content includes transferring electronic copies of a periodically published item to the terminal device.

Furthermore, according to an embodiment the serial number of the IC card is transferred to the access point, the validity of the number is checked, and in case the card is valid, the content, i.e. the tailoring parameters, are transferred to the terminal. The validity of the card can be checked according to the need defined by the content provider.

Furthermore, according to an embodiment of the present invention the transferred data may include different information in digital format and all digital information may be delivered through the access point to the terminal. The digital information may include one or more of the following: movies, music, games, electronic magazines, periodicals, newspaper and tv news. The digital information can be provided to the terminal device over a short range rf connection, such as over Bluetooth, via the access point.

Furthermore, according to an embodiment of the present invention the transferred data includes a prepaid amount of the content. The pre-payment may occur on buying the card. The card includes information identifying the content for which card is payment, i.e. what content will be delivered from the access point to the terminal. The card may be activated when it is bought in order to avoid unallowed utilisation of the cards.

Furthermore, according to an embodiment of the present invention the transferred data may include a series of a movie. This allows a content provider to provide different content and to find out which content, and to which extent certain content, interests the customers.

Furthermore, according to an embodiment of the present invention a certificate is connected to the goods/services or content to be delivered to the terminals. The tailoring parameters with the certificate transferred from the IC card are compared with a certificate stored in a register of certificates in the access point, and delivery is allowed only if a match occurs between the transmitted and the stored certificates.

Furthermore, according to an embodiment of the present invention distribution of the content to the access point may occur through a computer network or wireless broadcast network, and it can be made to take place preferably late in the evening, early morning or during nighttime when the network load is low. The delivery time may influence the distribution expenses and will affect money paid for the content—i.e. the delivery time will affect the number of units deducted from the IC card against the delivered electronic content.

Furthermore, according to a further embodiment of the present invention, the invention relates to gathering of information on how many media, how much data, and what data are transmitted between an access point and a terminal. Thus a count on the copyright payments for musical compositions may be maintained.

Furthermore, according to an embodiment of the present invention a solution to control the access of many users to the same access point is provided.

According to a further aspect of the invention there is provided a system for distributing electronic content, comprising a network connection as a transfer medium for transferring electronic content, a network element for transferring selected electronic content over the network connection according to predetermined tailoring information, the tailoring information defining what electronic content is to be transferred from the network element, and a terminal device for receiving electronic content over the network connection. The system includes a memory module for storing the tailoring, the memory module being separate from and releasably attachable to the terminal device, and attaching means for attaching the memory module to the terminal device, the terminal device being adapted to read the tailoring information from the memory module and to transmit the tailoring information to the network element over the network connection, and the network element being adapted to transfer electronic content to the terminal device over the network connection according to the tailoring information.

According to yet another aspect of the invention there is provided a memory module for storing information and for use with a terminal device. The memory module comprises a storage medium for storing tailoring information relating to specific electronic content, the tailoring information defining the specific electronic content that the memory module authorizes to be transferable to the terminal device, and an interface for mechanically and electrically coupling the memory module to the terminal device, the memory module being releasably attachable by a user to the terminal device for bringing the memory module into mechanical and electrical contact with the terminal device.

According to a still further aspect of the invention, there is provided a terminal device having means for wireless communication. The terminal device comprises a storage device for storing tailoring information relating to specific electronic content, an interface for mechanically and electrically coupling the storage device to the terminal device, the interface allowing releasable attachment of the storage device by a user to the terminal device for bringing the storage device into mechanical and electrical contact with the terminal device, means for reading the tailoring information from the storage device to the terminal device when the storage device is mechanically and electrically connected to the terminal device, the tailoring information defining the specific electronic content that the storage device authorizes as being transferable to the terminal device, means for transmitting the tailoring information over the wireless communication in order to receive electronic content to the terminal device according to the tailoring information read from the storage device.

BRIEF DESCRIPTION OF THE DRAWINGS

These and other aspects and advantages of the present invention are more apparent from the following detailed description and claims, particularly when considered in conjunction with the accompanying drawings. In the drawings:

Figure 20:
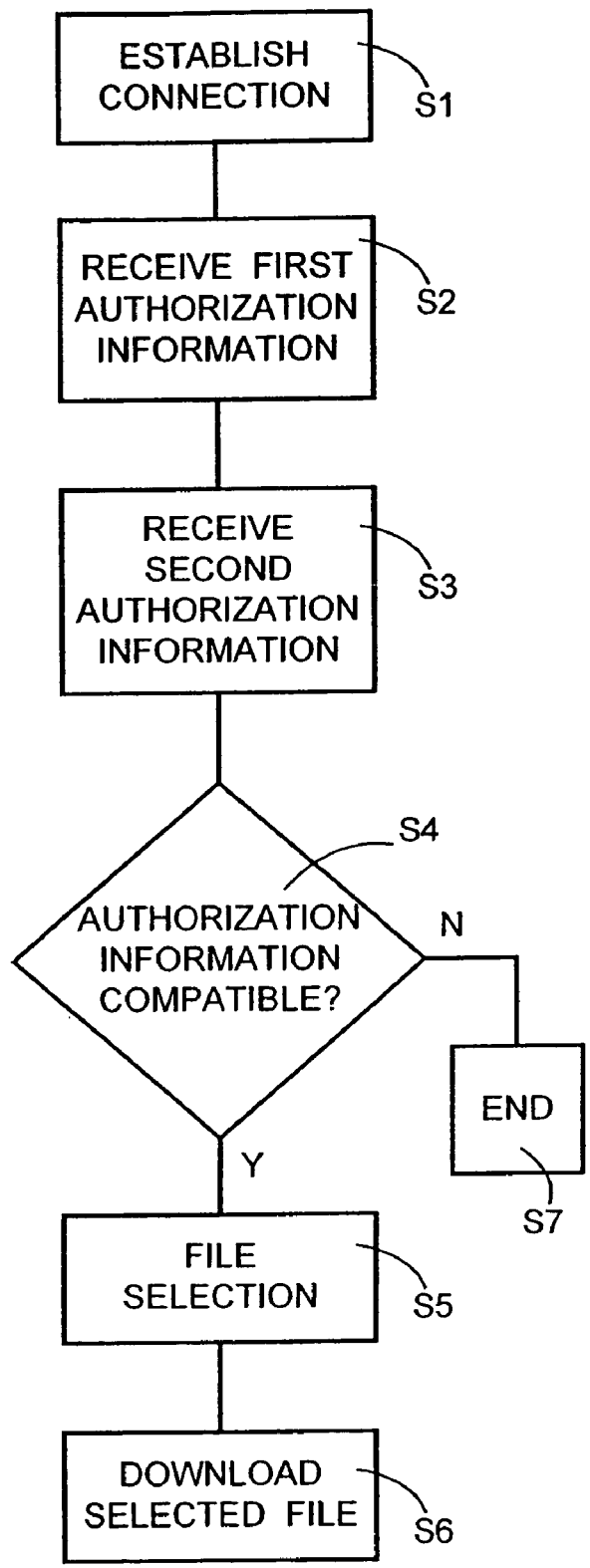

Each of FIGS. 6–19 is a block diagram of an alternative embodiment of an electronic content delivery system in accordance with the present invention;

FIG. 20 is a flowchart of a process for delivering electronics content in accordance with a preferred embodiment of the present invention.

Figure 21:
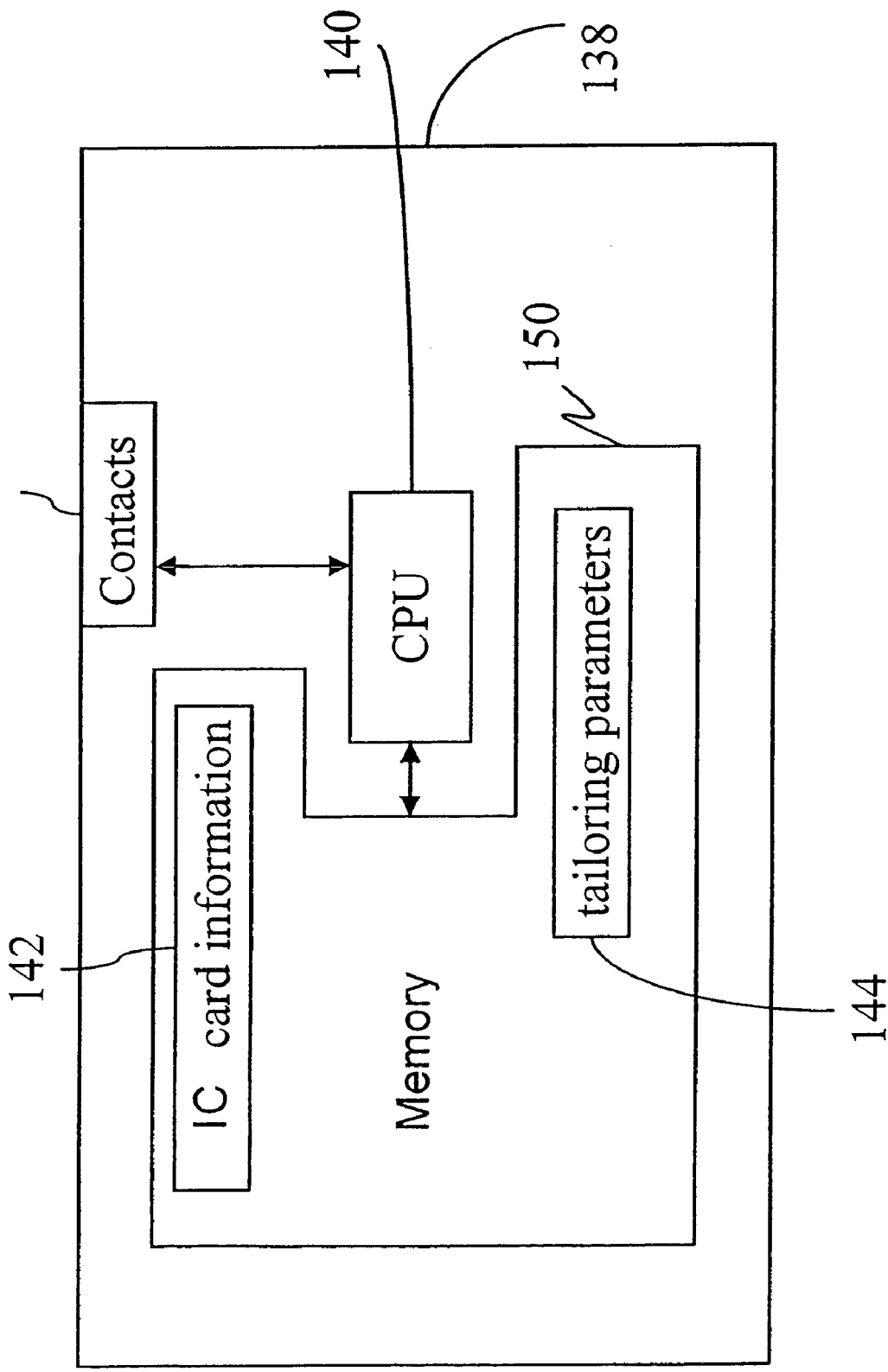
Figure 22:
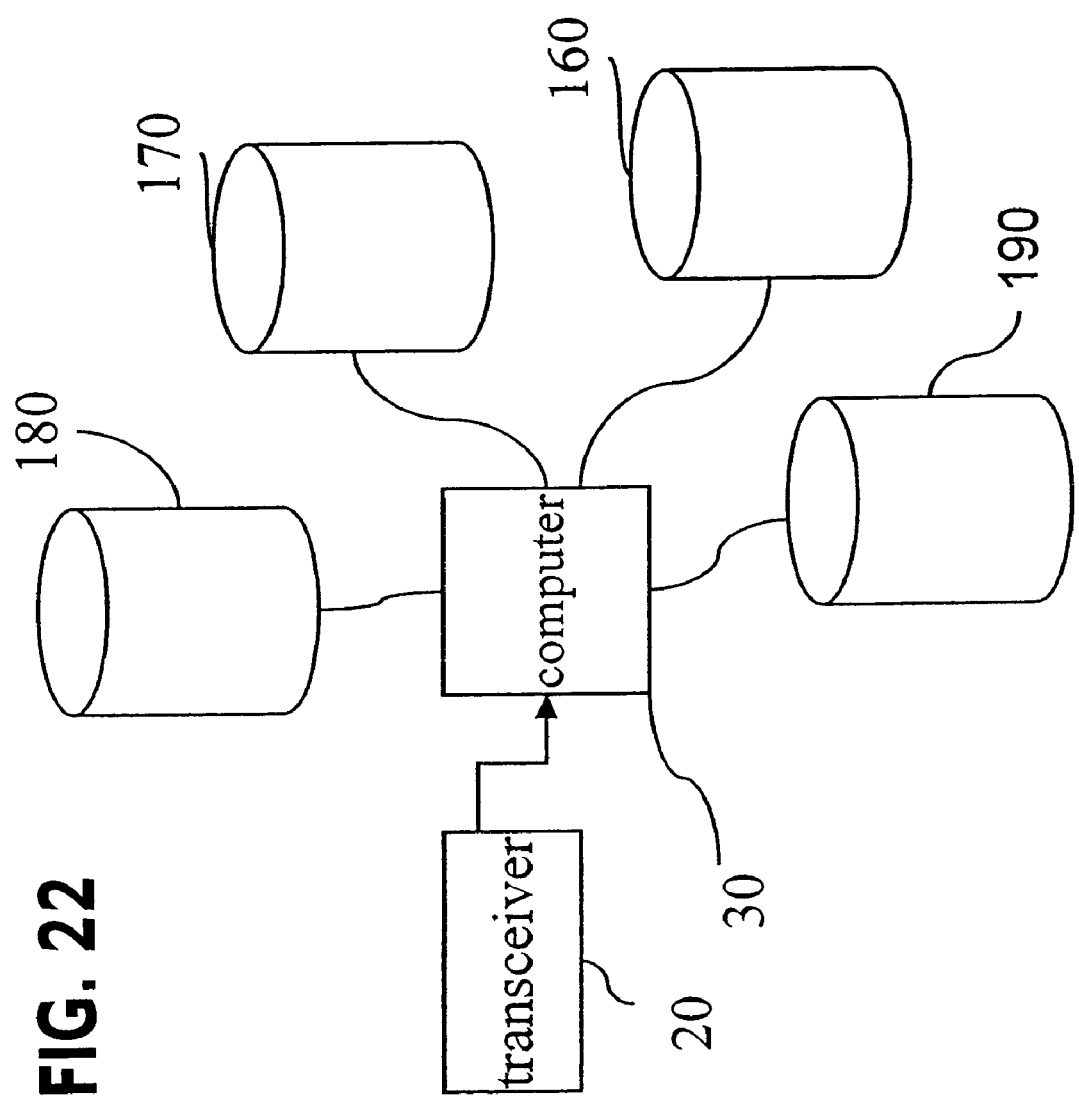
Figure 26:
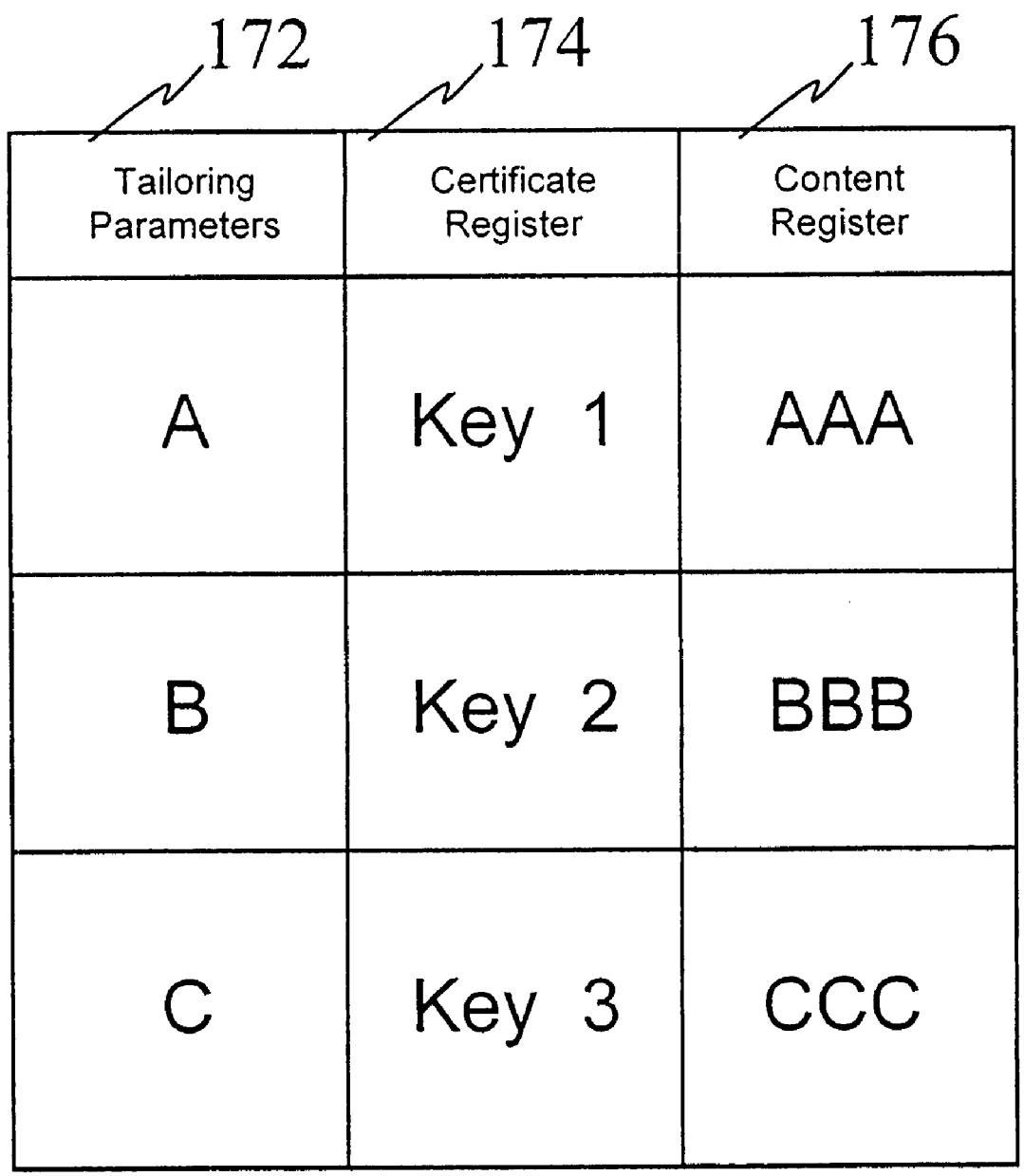
Figure 27:
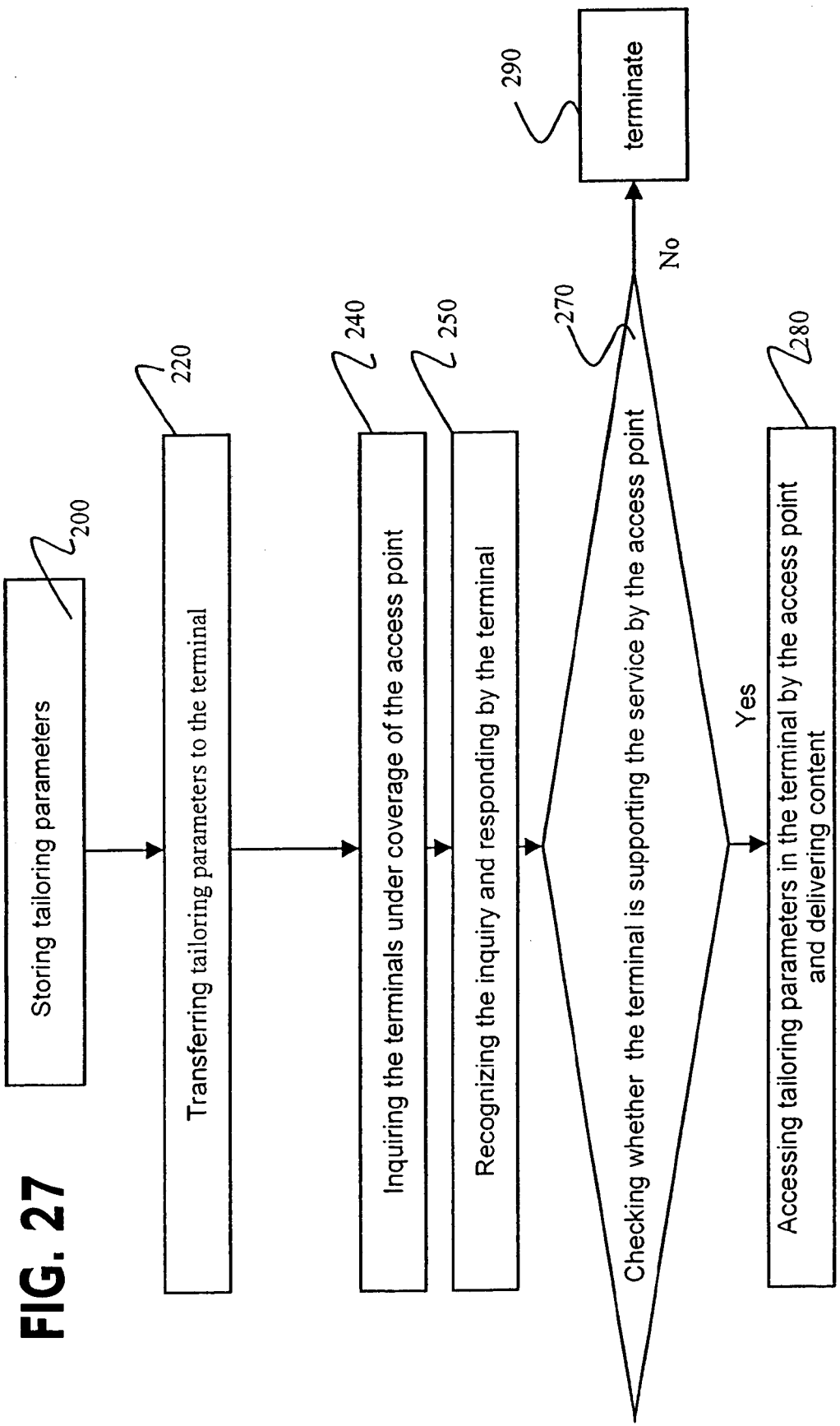
Figure 28:
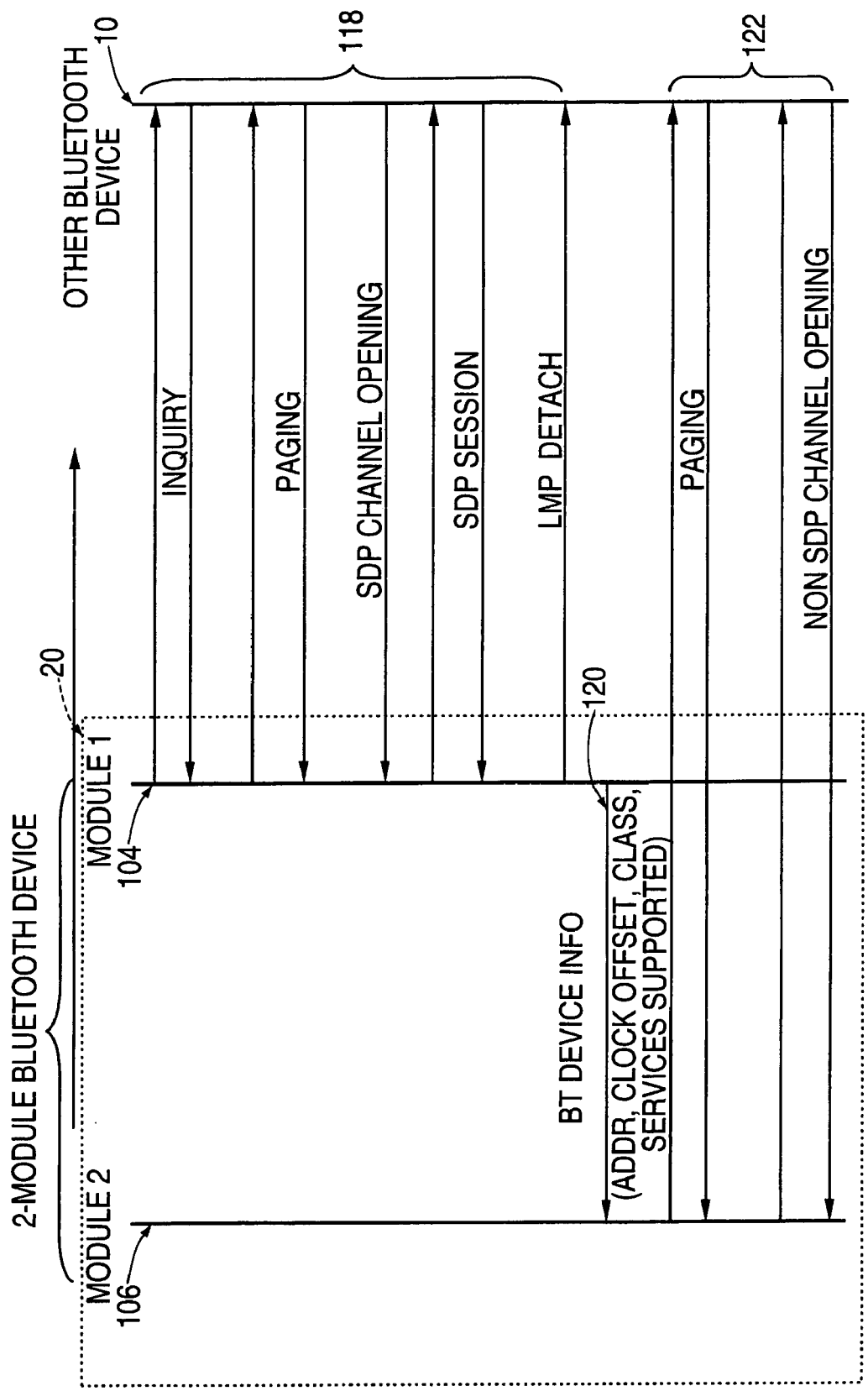
Figure 29:
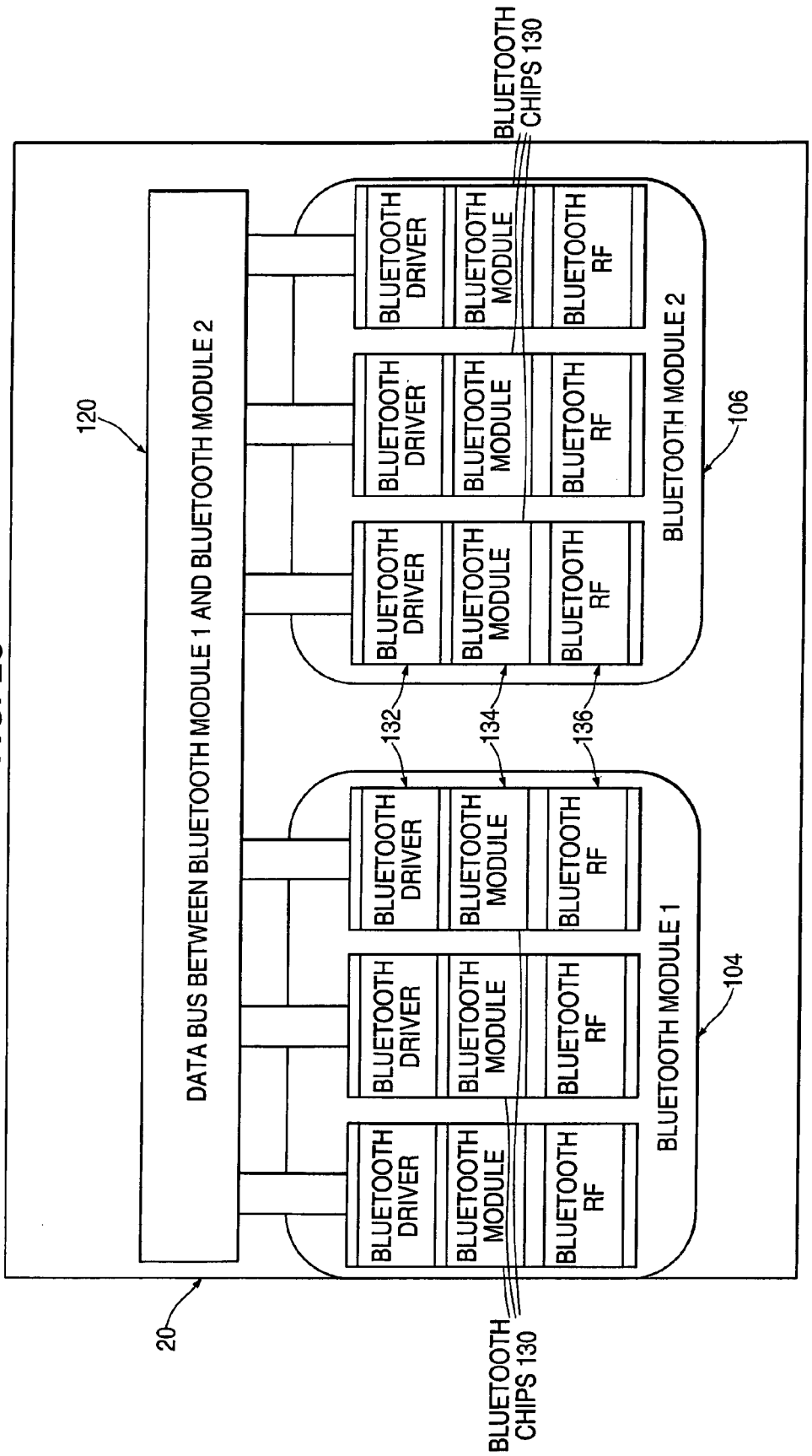

FIG. 21 schematically presents an IC card,

FIG. 22 illustrates one embodiment of registers utilised in the invention,

FIG. 23 illustrates an embodiment of an transceiver location register according to the invention, FIG. 24 illustrates one embodiment of an IC card maintenance and validity register of the invention, FIG. 25 illustrates one embodiment of a Content description and availability database of the invention, FIG. 26 illustrates an embodiment of IC card ID register;

FIG. 27 illustrates a flow chart of an embodiment of a method of content delivery information according to the invention, FIG. 28 illustrates a block diagram of one embodiment of the access point according to the invention, FIG. 29 illustrates one embodiment of how two separate Bluetooth modules are integrated in a single device.

DETAILED DESCRIPTION OF PREFERRED EMBODIMENTS

Figure 1:
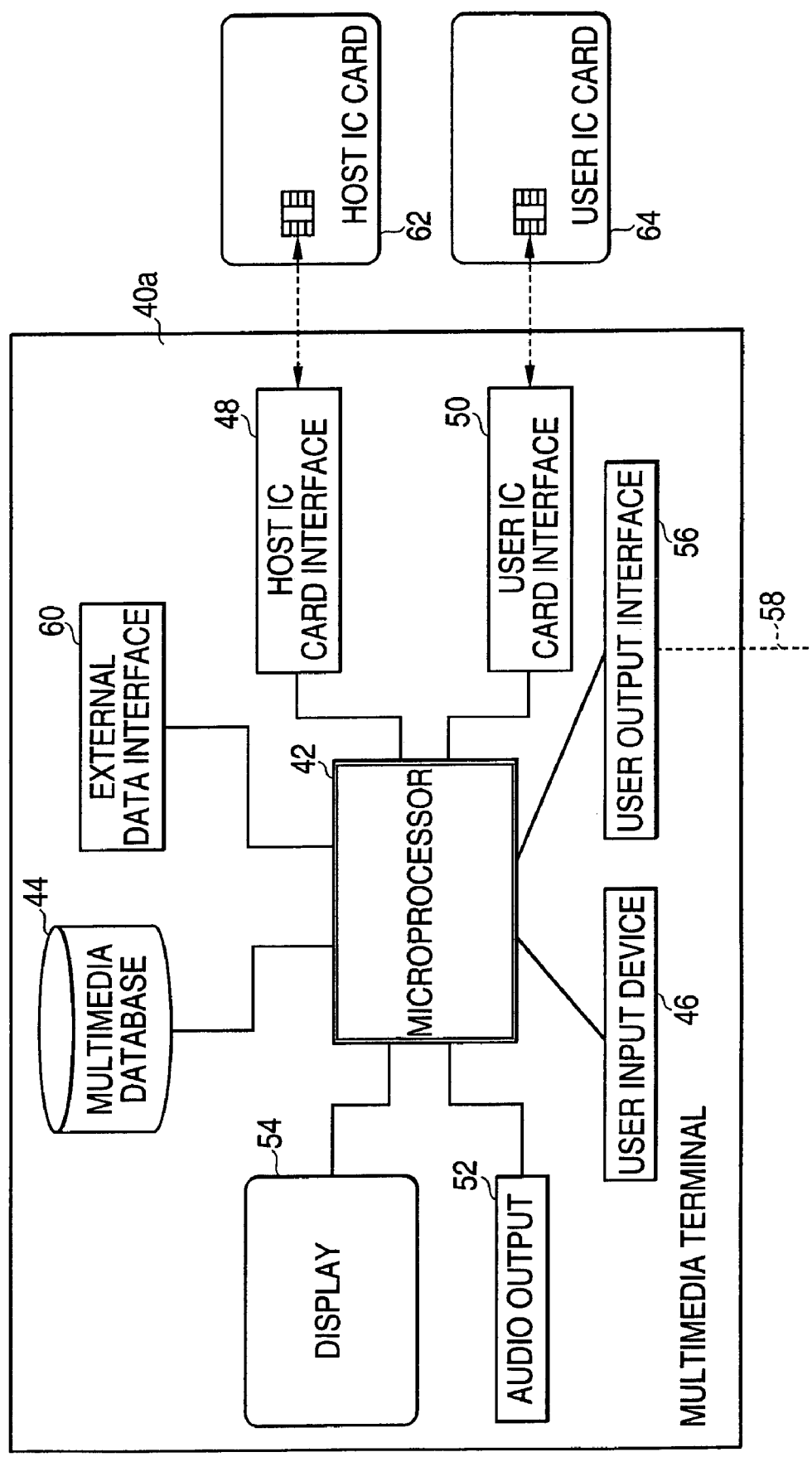
FIG. 1 is a block diagram of a first embodiment of an electronic content delivery system in accordance with the present invention.

FIG. 1 is a block diagram of a multimedia content delivery system in accordance with one embodiment of the present invention. A multimedia terminal 40a includes a microprocessor 42 which has connected to it a multimedia database 44, a user input device 46, a host IC card interface 48, a user IC card interface 50, an audio output device 52, a video output device or display 54, and a user output interface 56 from which an output can be provided in electronic form over an appropriate link 58. In addition, if desired multimedia terminal 40 can have an external data interface 60 connected to microprocessor 42. Multimedia database 44 has stored within it a plurality of multimedia files. By way of example, the files may include audio files, such as music, or video files, such as movies, games, newspapers, or electronic books.

Figure 2:
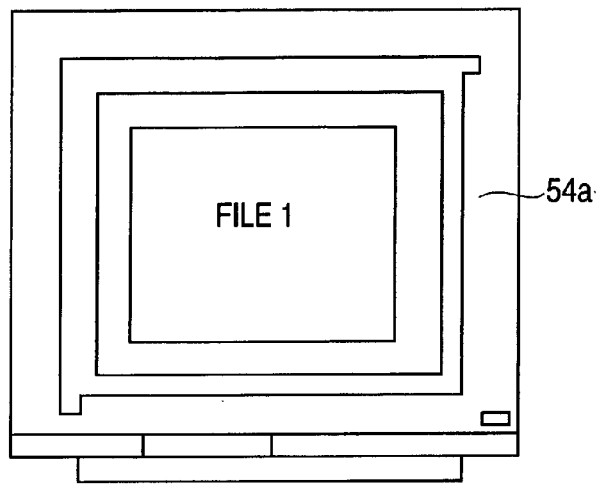
FIGS. 2–4 illustrate content menus that might be provided in an electronic content delivery system in accordance with the present invention.
Figure 3:
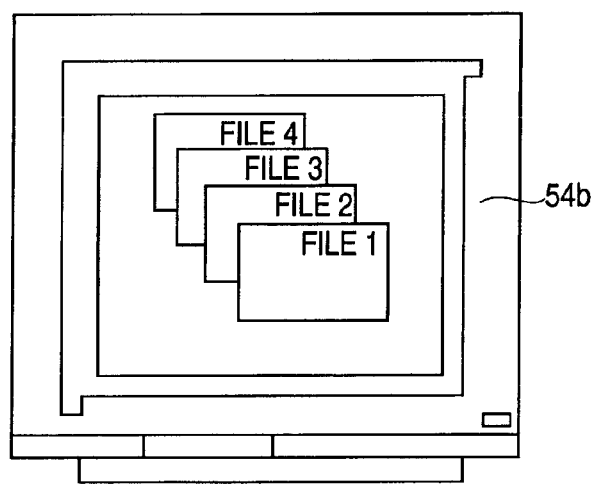
Figure 4:
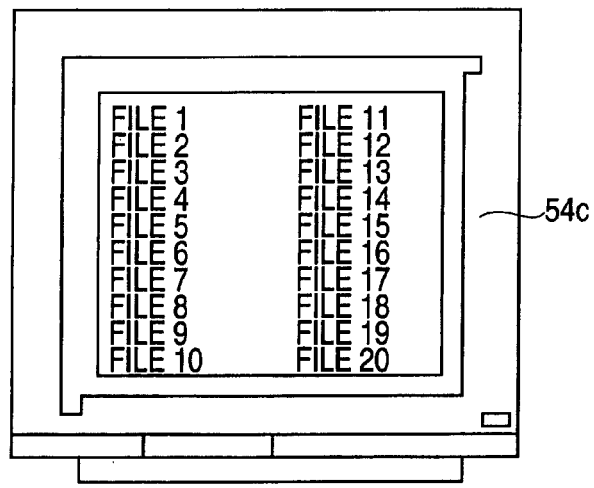

Multimedia terminal 40a might be located in a kiosk in a retail establishment such as a convenience store or a shopping mall. When a customer wishes to access a multimedia file from database 44, the proprietor of the establishment at which multimedia terminal 40a is located inserts a host IC card 62 into host IC card interface 48 and provides the customer with a user IC card 64. The customer then inserts IC card 64 into a user IC card interface 50 and actuates the user input device 46 to select one or more multimedia files to be downloaded. When multimedia database 44 stores a large number of multimedia files, the user might utilize input device 46 to cause a display of a menu of accessible files on display unit 54. FIGS. 2–4 illustrate alternative forms in which such a menu might be presented on display unit 54. The customer then uses input device 46 to select one or more of the available files for downloading. If the multimedia terminal is to provide only a single-use output of the selected file, for example for the entertainment or the education of the user, then that output might be provided to audio output device 52 or video display device 54. Audio output device 52 might be a load speaker or a set of headphone, while video display output device 54 might be a suitable display screen. Alternatively, if multimedia terminal 40a is to provide the file in an electronic format for duplication by the customer, then the selected file is provided in electronic form to user output interface 56 from which it can be obtained and electronically recorded by the user by means of communication link 58, for example to a laptop computer or to a wireless personal terminal such as a palm pilot. Communication link 58 might be a wireless link, with user output interface being an appropriate wireless transmitter, or a wire link, with user output interface being an appropriate connector or jack for receipt of a cable from the customer or being a cable for insertion into a jack on the customer's laptop computer.

Host IC card 62 and User IC card 64 have encoded therein authorization information which microprocessor 42 compares. The authorization information relates the two cards and identifies files in multimedia database 44 to which the user of IC card 64 is to be permitted access. Thus, for example, the authorization information may indicate a specific multimedia file, a group of multimedia files, a category of multimedia files, a maximum number of multimedia files, or a maximum monetary value of multimedia files that the user is authorized to download, whether to audio output device 52, video display device 54, or via user output interface 56 to a magnetic media output device coupled to link 58. If microprocessor 42 finds that the authorization information in user IC card 64 is compatible with that in host IC card 62, then the microprocessor permits selection of one or more multimedia files and provides the content of the selected files for downloading. By "downloading" is meant providing information in audio format via audio output device 52, providing information in video format via display device 54, or providing information in electronic format via link 58.

Figure 5:
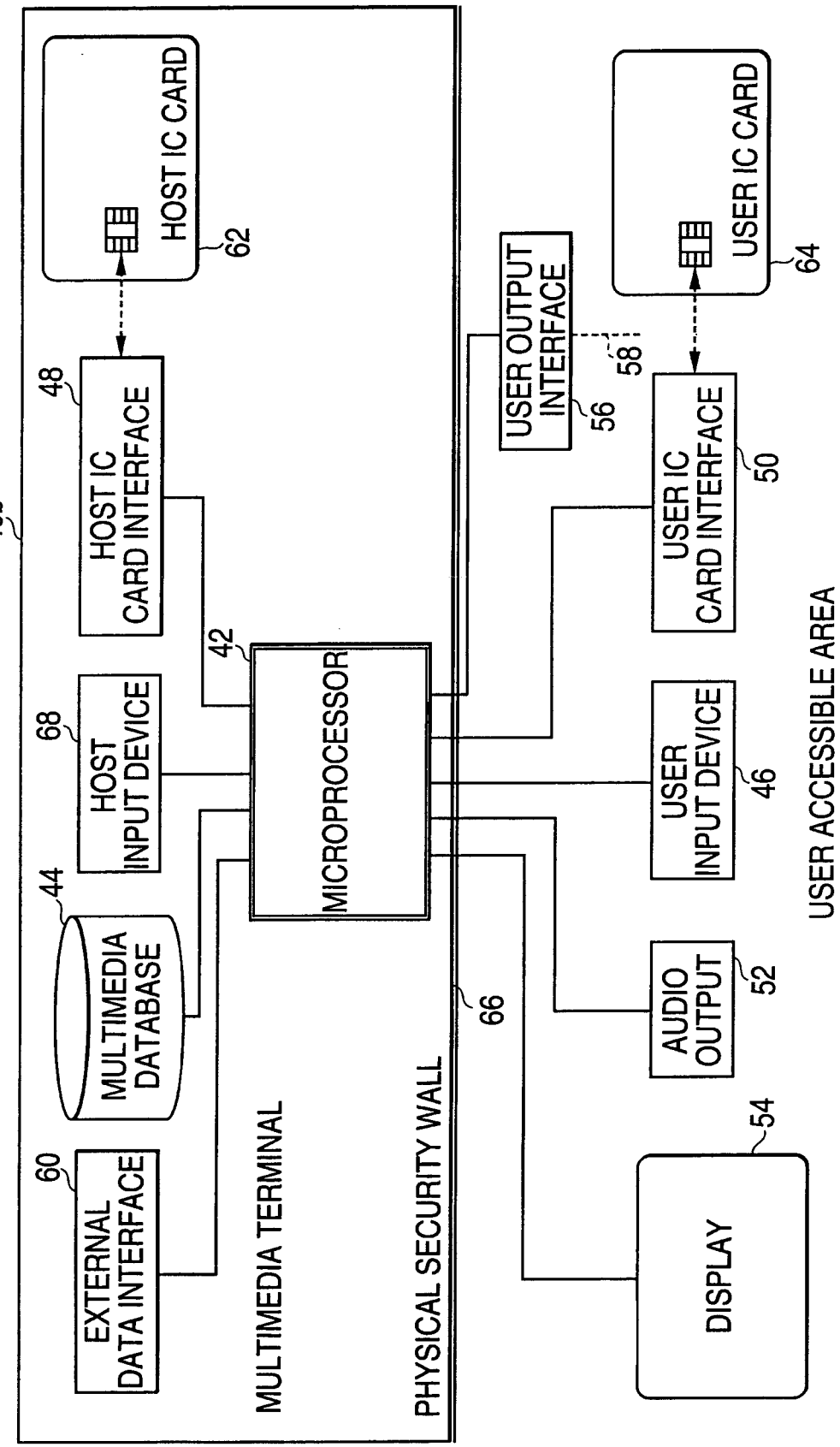
FIG. 5 is a block diagram of a second embodiment of an electronic content delivery system in accordance with the present invention.

In the embodiment of FIG. 1, host IC card 62 is inserted into multimedia terminal 40a for each customer. FIG. 5 depicts an alternative embodiment of a multimedia terminal 40b which might be provided as a stand-alone kiosk in a location at which the terminal proprietor may not always be present, for example in a central court of a shopping mall or an airport terminal. Microprocessor 42, multimedia database 44, host IC card interface 48, and external data interface 60 are provided within a physical security wall 66 of multimedia terminal 40b where these components are physically secure from access by unauthorized persons. User input device 46, user IC card interface 50, audio output device 52, video display output device 54, and user output interface 56 are outside physical security wall 66 where they are accessible by a customer. If desired, multimedia terminal 40a can also include a host input device 68 within physical security wall 66 to permit the owner of the multimedia terminal to cause input of control information or data, for example to input additional multimedia files through external data interface 60 for storage in multimedia database 44. Likewise, such a host input device can be provided in multimedia terminal 40a of FIG. 1, if desired. If multimedia terminal 40b is in a public location such as described, then host IC card 62 might be inserted and secured in host IC card interface 48 within the physical security wall 66 of a kiosk so that it is not necessary to have the host IC card inserted for each use. By way of example, the host IC card 62 could be inserted into interface 48 at the beginning of a business day and be removed at the end of the business day.

Figure 6:
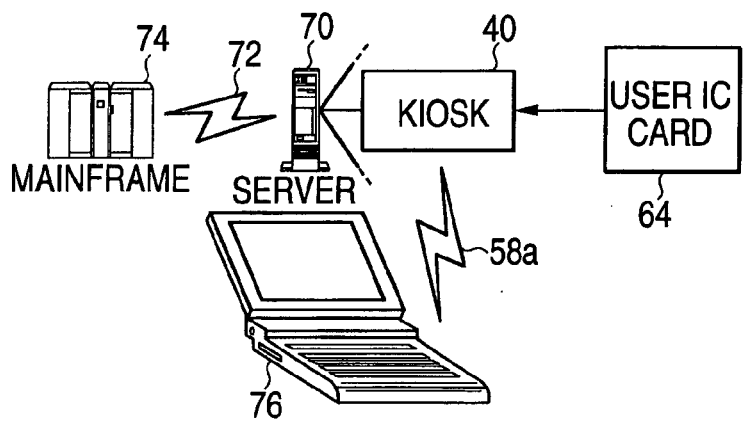
Figure 7:
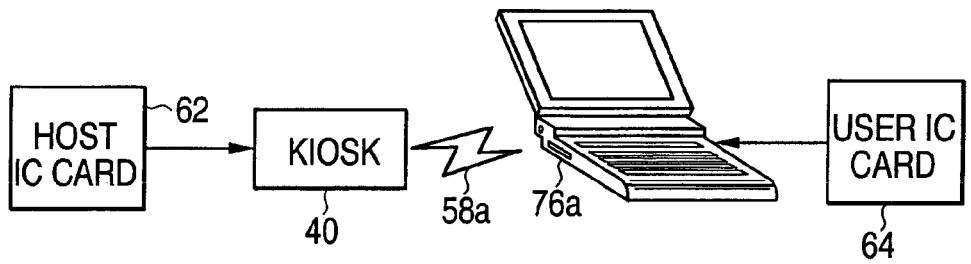

Various types of microprocessor-based systems might be used as a multimedia terminal in accordance with the present invention. FIGS. 1 and 5 depict systems in which the multimedia files to which access might be obtained are contained within multimedia database 44 within the multimedia terminal 40a or 40b of a kiosk. In the following description, "kiosk 40" is used to refer to either the multimedia terminal 40a of FIG. 1 or the multimedia terminal 40b of FIG. 5, and the depiction in the drawings of a kiosk 40 indicates either type unless otherwise obvious. As illustrated in FIG. 6, the kiosk 40 might be coupled by way of its external data interface 60 to a server 70 which is connected by a wireless communication network 72 to a main frame computer 74. Server 70 might serve a large number of kiosks such as kiosk 40, as depicted in FIG. 6. Main frame computer 74 can store a very large number of multimedia files and can augment the files within multimedia database 44 either at scheduled intervals or in response to requests by way of host input device 68. Alternatively, the principal library of files can be contained within server 70, with no need for a connection to a main frame computer. A customer can download a multimedia file to the customer's laptop computer 76, as shown in FIG. 6. While FIG. 6 shows the user IC card 64 being inserted into a user IC card interface 50 at the kiosk 40, FIG. 7 depicts a variation in which the laptop computer 76 is equipped with the user IC card interface so that the user IC card 64 is inserted into that interface within the laptop computer.

Figure 8:
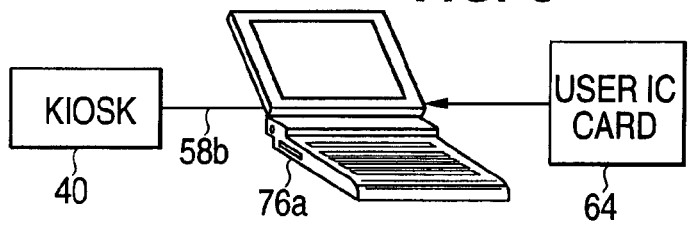
Figure 9:
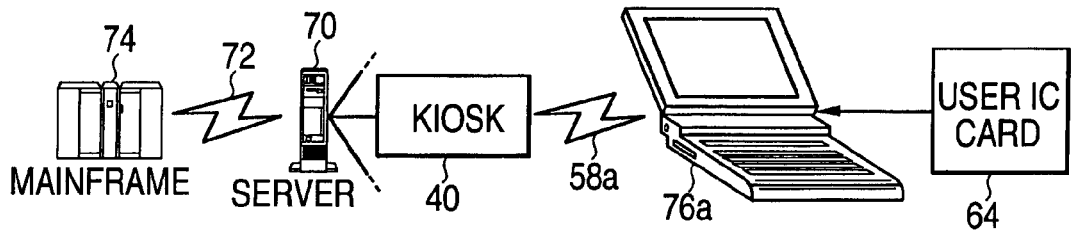
Figure 10:
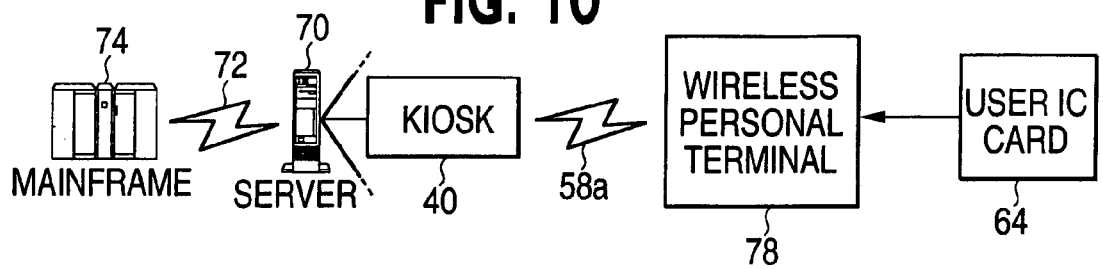

FIG. 8 depicts the laptop computer 76 communicating with kiosk 40 by means of a cable 58b, rather than the wireless connection 58a of FIG. 8. FIG. 9 illustrates how a laptop computer 76 can be in wireless communication with kiosk 40 which is connected through server 70 and wireless communication network 72 to main frame 74. Rather than a laptop computer, a wireless personal terminal 78, such as a palm pilot, can be used to download multimedia files from kiosk 40, as depicted in FIG. 10. Kiosk 40, in turn, can be connected to server 70 which can be connected by wireless communication network 72 to main frame computer 74 for receipt of a larger volume of multimedia files.

Figure 11:
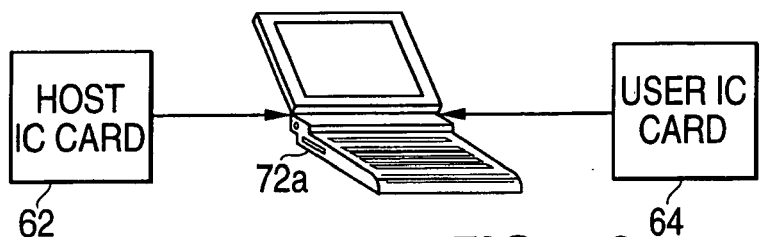
Figure 12:
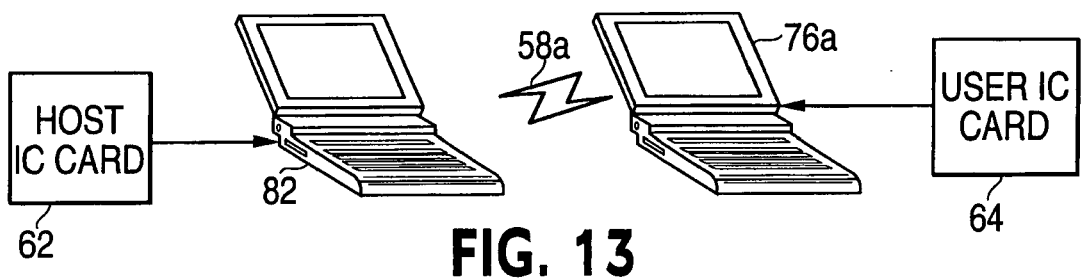
Figure 13:
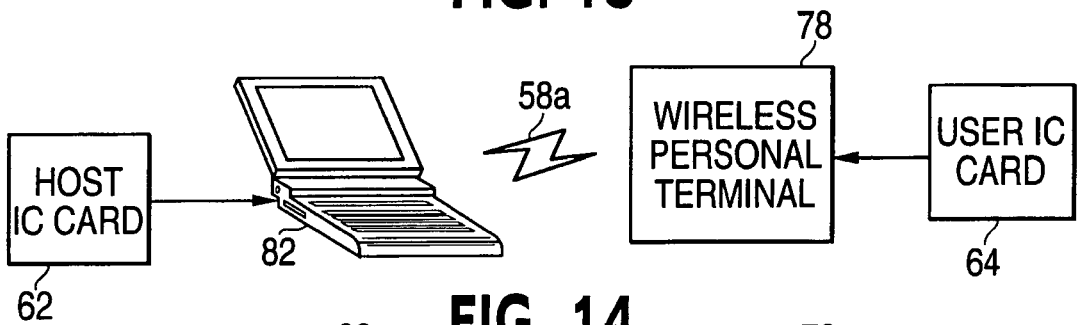
Figure 14:
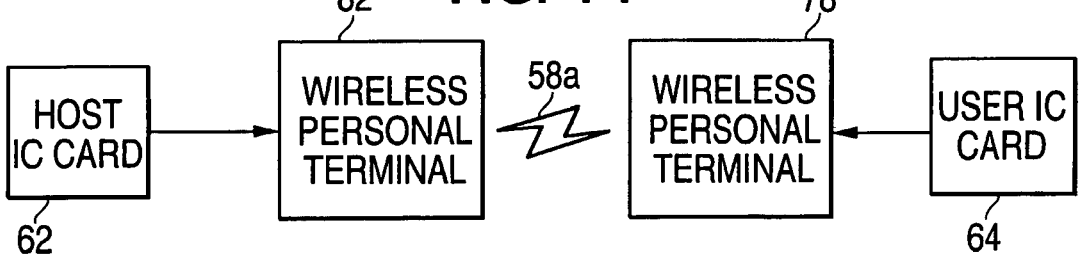
Figure 15:
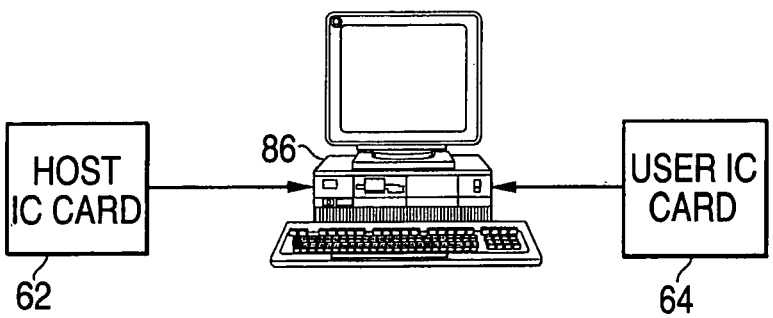
Figure 16:
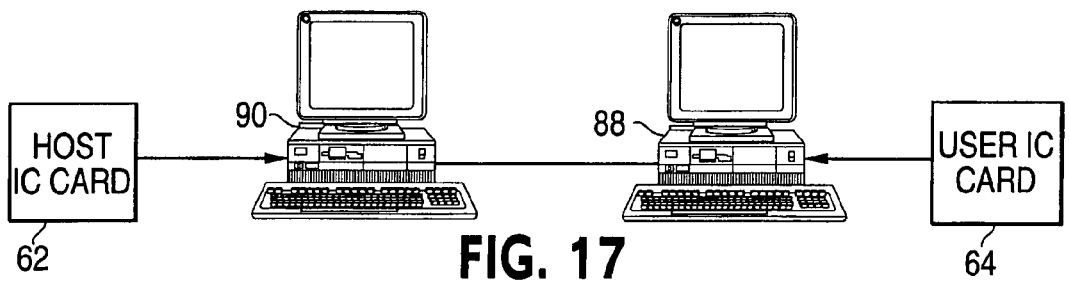
Figure 17:
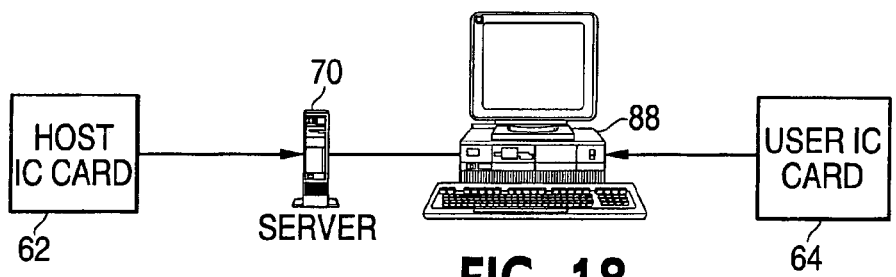
Figure 18:
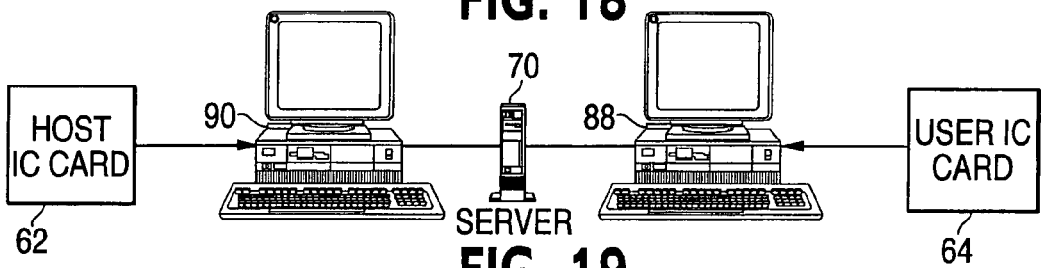
Figure 19:
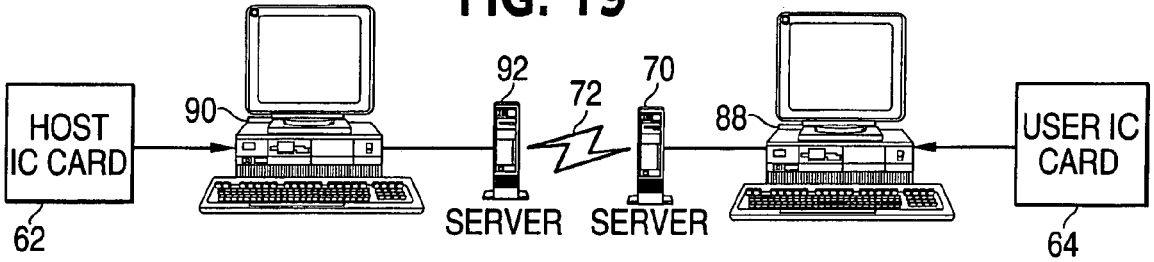

Rather than in a kiosk, the multimedia terminal can be included in a laptop computer 80 as depicted in FIG. 11. FIG. 12 illustrates how a first laptop computer 82 can be receive host IC card 62, while a second laptop computer 76 receives user IC card 64 to permit downloading of files from computer 82 to computer 76. FIG. 13 shows similar downloading from a host laptop computer 82 to a user wireless personal terminal 78. Likewise, FIG. 14 shows downloading from a host wireless personal terminal 84 to a user wireless personal terminal 78. Similarly, a personal computer 86 can be used as the multimedia terminal, as depicted in FIG. 15. A user personal computer 88 can be connected to a host personal computer 90 as illustrated in FIG. 16, or to a server 70 as illustrated in FIG. 17. Similarly, user personal computer 90 can be connected through a server 70 to a host personal computer 90, as depicted in FIG. 18, or through a first server 70 and a second server 92 to host personal computer 90, as in FIG. 19. Any of the above described connections can be wire connections or wireless connections.

FIG. 20 depicts the steps in an illustrative downloading process in accordance with the present invention with reference, for example, to the system as illustrated in FIG. 8. In step S1, a connection is established between a laptop computer 76 and kiosk 40. In step S2 the microprocessor 42 within kiosk 40 receives authorization information from host IC card 62. If the host IC card is left within the host IC card interface of the multimedia terminal during the business day, then, of course, that information might already be in the microprocessor. In step S3 the microprocessor receives authorization information from user IC card 64. In step S4 microprocessor 42 determines whether the authorization information from user IC card 64 is compatible with the authorization information from host IC card 62. If so, then in step S5 the multimedia terminal permits selection of one or more files from multimedia database 44, and after the selection is made the terminal permits downloading of the selected files in step S6. If step S4 results in a determination that the authorization information in user IC card 64 is not compatible with that in host IC card 62, then the process ends in step S7.

The use of the host IC card 62 and the user IC card 64 enables a proprietor of a multimedia terminal to allow a customer to download desired multimedia files, while limiting the customer's access to authorized files only. In a retail establishment that authorization might be based on a payment made by the customer at the time the user IC card 64 is provided to the customer. Alternatively, the user IC card 64 can be a credit card so that charges for files downloaded by the customer are made directly to the customer's credit card account. In such case, host IC card 62 can include authorization information identifying credit cards which the issuer of user IC card 64 accepts as authorization for the downloading.

IC cards or electronic chip cards are usually the size of a conventional credit card and have six or eight electrical contacts on one face and include inside an integrated circuit with memory and may include microprocessors. Data and programs for manipulating the data and communicating outside the card are included in the integrated circuit card. In the past the cards, like prepaid cards, have been widely used in the purchase of telephone service, particularly in France and Germany, where public pay telephones accept the prepaid cards instead of coins. Typically the prepaid cards are purchased at a location such as a post office for a specific amount. The cards are inserted in a public pay telephone, connection is made to the contacts and units of value are removed from the card as the telephone call progresses. The mechanical and electrical specifications of the cards are standardized, and one set of standards is published by the ANSI (American National Standards Institute), 11 West 42 Street, New York, N.Y. 10036 under the title "Identification cards-Integrated circuit(s) cards with contacts" ISO 7816-1 and ISO 7816-2. *)

IC cards have been manufactured and are commercially available from several companies including e.g. GEMPLUS Card International, Avenue du Pic de Bertagne, Parc d'activites de la Plaine de Jouques, 13420 Gemenos, France.

Once the prepaid card has been consumed, i.e., all of the units or value of the card has been used in calls, the user has to buy another card or has to refill the empty card to continue with the service.

The IC card which is purchased in advance and which is inserted into the terminal may be active right after it has been purchased. The activity of the card may be given for only a certain period of time. Thus the activity depends on the time limits given to the card.

In FIG. 21 a card, like the IC card 138 referred to above is depicted. The IC card includes a CPU 140, an IC card identification code such as a serial number 142, a tailoring parameters register 144, and contacts 146 for enabling mechanical and electrical contact to the card reader 126 in terminal 10. Tailoring parameters 144 with the card ID are stored in an IC card memory 150. After the card is inserted into card reader 126 in the terminal 10 and the information is read from the card to the terminal, the tailoring parameters 144, together with card ID 142 are accessible by the access point 20 via a Bluetooth link or other short range wireless link running between an access point/kiosk 20 and the terminal 10. Every time an offer for delivery of goods/services is placed in terminal 10 by access point 20, the terminal has the option to accept the offer, or not. The validity time of the card may be compared with a validity register stored in the IC card 138 and a validity table stored in the access point 20 of the service provider or content provider. The card validity might be based on a fee paid periodically such as monthly or annually. After the paid amount is received, the corresponding entry is made in the validity register.

With regard to the various elements of the IC card as being on an integrated circuit, the microprocessor and several registers may be all contained within a single chip. Also the information need not be allocated to unique space within the IC card memory. For example, the various numbers in the registers may be moved around under the control of the microprocessor. This would be in accordance with the design of the particular IC card chip.

The serial number of the IC card and possible other functions, like time and date of validity, may be written into the integrated circuit at the time of manufacture, or subsequent to manufacture. Any convenient or conventional type of circuit and method for the entry of such data may be used.

In FIG. 22 one embodiment of the registers of the invention is shown. Reference number 180 depicts the location register of access points. The service provider may manage the geographical location information of the access points. The access point may collect information about the users in the access point The location information may be linked to the computer 30 of the access point 20. The IC card maintenance and validity register 190 may be linked also to the computer 30. Content description and availability database 190 may be part of the computer system 30 as described in FIG. 4. An IC card ID register 170 of the access point gives the possibility to control transfer of data.

An access point location or transceiver location register 180 may contain information about the access points located in the different sites as described in FIG. 22. In FIG. 23 such a register is shown, where the transceiver or the access point ID, such as Transceiver No. 1, is presented in one column. Then the location of each access point is described in a second column, such as 281001 city. The information to deliver can be localized utilizing the location information of the access points. For example, advertisements may be distributed according to the location, and this information can be linked to the cards sold in this specific area. Therefore the IC card ID column, having the IDs such as 8139008877, can be added to this register. It will be understood that many other ways to link the IC card ID and the location of access point can be used.

FIG. 24 depicts one example of an IC card maintenance and validity register 160. The register 160 includes an IC card ID column, a "Valid" column having validity data for the card in the form of No or Yes, indicating that the card is either valid or not, a content description column, having content such as AAA or BBB, that can be transferred from the access point, a locations column indicating the location where the content is available, a "valid until" column indicating validity time of the card data, e.g. January 2000, and a column "usage units" with information about the usage of the content or how many users have paid for the card or how many transfers from the access point have occurred, e.g. 50 or 100, to utilize this information later.

FIG. 25 discloses one example of a register in content description and availability database 190. The register 190 has a content ID data column and a column with content description data, such as News and possibly local news info or other specifying title. Further it may have a column with information about availability data for the content, i.e. in which location the content can be found. A DRM or digital rights management information data column may have a link to another server where particular copyright payments may be arranged. Again there can be a column for usage data of the content, again for later utilization of the data. It will be understood that FIGS. 23 to 25 are shown as examples only, and numerous variations can occur.

In FIG. 26 an embodiment of an IC card ID register 170, a tailoring parameters register 172 which takes care of the tailoring of content to be transferred to the terminal, and a possible certificate register 174, with e.g. password, is connected to the goods/services or content register 176, respectively, in case a password is required for delivering the content. Comparison between the certificate transferred from the prepaid card and the one in register may be performed in the microprocessor. Alternatively, the comparison could be performed in a separate counter or comparator (not shown).

The registers in FIGS. 23–26 relate quite closely to each others and they can be located close to the access point in a preferred embodiment or also in other locations, such as in the content provider location, in order to have the possibility of obtaining global content or other additional content. These locations again are not limited to what is presented, but other available solutions can be utilized.

A method of delivering content information in accordance with the invention is further described in the FIG. 27 regarding an access point as illustrated in FIG. 28. In step 200 content filtering parameters (ie. tailoring parameters) 144 are stored on IC card 138. After the card is inserted into the terminal 10, the information is read from the card to the terminal in step 220. After the user of the terminal 10 has entered the cell of access point 20, the content delivery device 38 or the access point 20 will send an inquiry to the terminal 10 in step 240. If the inquiry is recognized by the terminal 10, the terminal 10 responds to the access point 20 in step 250, and a connection is opened between the terminal 10 and the access point 20. Next, in step 270 there is a check whether the terminal is supporting the card application. If "yes", the tailoring parameters are accessible by the access point 20 via a Bluetooth link running between an access point/kiosk 20 and the terminal 10 in step 280. Based on the tailoring parameters, which now have been transferred from the card to the Bluetooth transceiver system of the terminal, the content is delivered to the terminal also in step 280. If the answer is "no" in step 270, the connection between the terminal and access point is terminated in step 290.

Tariff data as received from the IC card maintenance and validity database 160 is stored in a register in the Content description and availability database 190 for using that information, for example, for digital rights management (DRM) purposes, analysis of a user, e.g. for possible preference or behavior control of the particular item downloaded from the network by tracking consumer preferences at the prepaid center of the access point. That information may be used later on to control the availability of different items in that access point. Possibly according to the consumption of the digital content the information (such as the mentioned tariff data) will be arranged to be available closer to the location of the access point in a local cache or proxy type device close to the access point. The station could then provide very fast downloads to the users, and the network downloads would not load so much the whole network. However it is appreciated that the downloadable information may be stored at the access point, e.g. once a month, as a package, such as Magazine No 1, Magazine No 2, Magazine No. 3 etc, Movie No. 1, Movie No. 2, Movie No. 3 etc., according to the publication of that information by the content provider, such as the publishing company. The storage of the information package at the access point may occur from almost any reproducing/editing/recording storage apparatus in the form of information transfer. The transfer could happen through a network connection, or the information can be distributed to the shop as hardware such as on a CD, MP3, a Digital Video Disc (DVD), a video cassette tape et al. When received, the merchant can install the information to the access point from the received hardware. Other possible distribution channels can be wireless mobile communication such as GPRS, EDGE, 3G, UMTS, DVB-T or other. Then the respective receiver system would be installed in the access point. DVB-T transmission could happen in the time when the transmission time is cheap and the usage of the network is low, e.g. in the late evening, early morning or at nighttime.

When recording the downloadings in the access points, and adding that information to the disclosed registers (FIGS. 23–26) it can be determined how many users have downloaded content and what content. Therefore, the existence of the copyright obligations for the musical compositions is easily determined, and the copyright owners or media industry can collect royalties for their copyrights.

When the IC card is read by the card reader and validity of the card is confirmed, the selected subscription is available to view and/or listen. The music content may include at least one music code (country code, work code), the name of musical composition, the time duration of the musical composition, the name(s) of the artist(s), the country code of the artist(s), the manufacturing or recording date, preview availability, the owner(s) of the original disc, the country code(s) of the owner(s) of the original disc, and co-owner(s) and country code(s) of the co-owner(s), if any.

The so called OBEX or Object Exchange protocol can be used as a transport mechanism for the tailorization parameters between the access point and the receiving terminal device. OBEX is rather flexible and simple and can be used within the framework of one of the existing Bluetooth profiles, in case the process of retrieving tailorization parameters shall be open to just any Bluetooth terminal in the future.

As already said, in order to allow for tailorization of the content to be delivered on a terminal per terminal basis, tailorization parameters are stored on an IC card. The information to be delivered to that particular terminal is tailored in accordance with the preferences, setting, etc. Examples of those might be, but not limited to those described for example in U.S. Pat. No. 5,754,939: author, language in which document is written, date of creation, date of last update, length in words, reading level, quality of document as rated by an editorial agency, list of other readers who have retrieved this document (associative), attributes for each target object, first two digits of zip code, first three digits of zip code, entire five-digit zip code, distance of residence from advertiser's nearest physical storefront, annual family income, number of children, list of previous items purchased by this potential customer (associative) that are stored as tailorization parameters on the IC card. Information delivery then takes place, again using a Bluetooth link between the delivering device and the terminal. However, other possibilities to include as transferable data may be catalogues of decorations. The user will load wall paper models to the terminal and then "carry" this information home. Then he/she can view these patterns against his/her house walls. The images, photographs, on-line albums, applications like Java applets will be included. The parameters to filter the content may comprise subscriptions of magazine issues Nos. 1 to 3, movie series: e.g. first three episodes, vouchers like one free copy of coming new magazine as an advertisement.

A further embodiment of the invention will be illustrated regarding a situation when many terminals will access the services provided by the access point. Whereas the present invention can be implemented by using one short range rf transceiver at both the terminal device 10 and the access point 20, this further embodiment comprises an access point implemented with two transceivers, one being used for receiving tailoring parameters from the terminal device and another being used for transmitting the electronic content to the terminal device. Accordingly, as depicted in FIG. 28, the access point 20 includes at least a first transceiver module 104 and a second transceiver module 106. A first communication link 118 is established between the wireless terminal 10 and the first transceiver module 104 of the access point 20. A communication bus 120 is provided between the first transceiver module 104 and the second transceiver module 106 in the access point 20 for transferring information about the communication between the wireless terminal 10 and the first transceiver module 104. A second communication link 122 is established between the second transceiver module 106 and the wireless terminal 10 based on the information received from the first transceiver module 104. It will be understood that the number of the transceiver modules may differ according to the needs of the specific site etc.

FIG. 29 illustrates one embodiment of how the two separate Bluetooth modules 104, 106 with specialized roles may be integrated in a single device. In this example inquiries and Service Discovery functions are handled in Bluetooth module one 104, and RFCOMM based functions (specified in the Bluetooth Specifications) and other user data related traffic are handled in Bluetooth module two 106. In the FIG. 29 Bluetooth module one 104 and Bluetooth module two 106 each include three separate Bluetooth chips 130, but the number of chips may be any number, depending on the need. Each chip 130 comprises a driver part 132, a module part 134 that implements at least the lower layers of the Bluetooth protocol stack (whether the whole protocol stack, or only the lower layers are implemented depends on the role of the controlling entity or computer that the group of transceivers is linked to) and a RF transceiver part 136, as would be known to a person skilled in the art. According to the invention there are two operationally separate Bluetooth modules 104 and 106, Bluetooth module one 104 and Bluetooth module two 106. The modules 104 and 106 have separate baseband addresses allowing the modules 104 and 106 to operate independently. Module one 104 is discoverable and connectable to other Bluetooth enabled devices 10. Module two 106 is non-discoverable and non-connectable to other Bluetooth enabled devices 10, so the inquiries and other link and service information is not reachable with this module 106. Between the modules is a data bus 120, allowing data transfer between the modules 104 and 106.

Thus, the present invention, concerned with receiving at a terminal device specific electronic content based on tailoring parameters read from an IC card and delivered to the access point. The terminal device can also be equipped with a regular web or WAP browser for also accessing other information other than what is specified by the tailoring parameters.

The present invention is thus capable of implementation in many forms, all of which utilize comparability between a host IC card and a user IC card to authorize downloading of multimedia files. Although the invention has been described and depicted with reference to preferred embodiments, these are illustrative only, and rearrangements, alterations, and substitutions might be made, with the result still being within the scope of the invention.

What is claimed is:

1. A multimedia content delivery system, comprising:
a content provider providing multimedia files;
a first integrated circuit card interface in a multimedia terminal for receipt of a host integrated circuit card containing first authorization information;
a second integrated circuit card interface in said multimedia terminal for receipt of a user integrated circuit card containing second authorization information;
an input device for selecting at least one multimedia file from the plurality of multimedia files, wherein information regarding the selected at least one multimedia file comprises authorization information stored on the first integrated circuit card or the second integrated circuit card;

an output device for providing the content of at least one authorized multimedia file provided by the content provider to a user of the user integrated circuit card; and a control unit in said multimedia terminal, responsive to the host and user integrated circuit cards being received in the first and second integrated circuit card interfaces, which compares the first and second authorization information and when the first and second authorization information is found to be compatible actuates said output device to provide the content of the at least one multimedia file from the content provider selected by said input device under control of the authorization information which authorizes downloading of the at least one authorized multimedia file through the output device, contained in the first and second authorization information; and wherein the content is provided from a database external from the integrated circuit cards.

2. The multimedia terminal, as claimed in claim 1, further comprising said content provider, and said control unit therein enclosed therein.

3. A multimedia content delivery system, as claimed in claim 1, wherein said output device comprises an audio output device.

4. A multimedia content delivery system, as claim in claim 1, wherein said output device comprises a video output device.

5. A multimedia content delivery system, as claim in claim 1, wherein said output device comprises a communication link permitting downloading of the selected multimedia file in electronic form.

6. A multimedia content delivery system, as claimed in claim 5, wherein said communication link is a wireless communication link.

7. A multimedia content delivery system, as claimed in claim 1, wherein said content provider, said input device, said output device, and said control unit comprise a laptop computer.

8. A multimedia content delivery system, as claims in claim 1, wherein said content provider, said input device, said output device, and said control unit comprise a wireless personal terminal.

9. A multimedia content delivery system, as claimed in claim 1, wherein said content provider comprises a server.

10. A multimedia content delivery system, as claims in claim 1, wherein said content provider further comprises a mainframe computer coupled to said server.

11. A multimedia content delivery system, as claimed in claim 1, further comprising a server connected to said content provider.

12. A multimedia content delivery system, as claimed in claim 1, further comprising a mainframe computer connected to said server.

13. A multimedia content delivery system, as claimed in claim 1, wherein said multimedia files comprise audio media.

14. A multimedia content delivery system, as claimed in claim 1, wherein said multimedia files comprise video media.

15. A multimedia content delivery system, as claimed in claim 14, wherein said video media comprises text.

16. A multimedia content delivery system, as claimed in claim 15, wherein said text comprises electronic books.

17. A multimedia content delivery system, as claimed in claim 15, wherein said text comprises newspapers.

18. A multimedia content delivery system, as claimed in claim 14, wherein said video media comprises games.

19. A process for providing multimedia content from a content provider, comprising:

(a) storing a multimedia file, having the multimedia content, in a storage unit;

(b) providing a first integrated circuit card interface in a multimedia terminal for receiving of a first integrated circuit card containing first authorization information and a second integrated circuit card interface in said multimedia terminal for receiving of a second integrated circuit card containing second authorization information;

(c) associating first authorization information stored in the first integrated circuit card with at least one multimedia file provided by the content provider;

(d) receiving the first integrated circuit card and the second integrated circuit card in the integrated circuit card interfaces and comparing the first authorization information with the second authorization information to determine if the first and second authorization information is compatible; and (e) in response to step (d) when the first and second authorization is determined to be compatible, and without requiring a browser, providing the at least one multimedia file to an output device, to provide the at least one multimedia file from the content provider under control of authorization information, contained in the first and second authorization information, which authorizes the downloading of the at least one multimedia file through the output device to a user of the second integrated circuit card; and wherein the content is provided from a database external from the integrated circuit cards.

20. A process as claim in claim 19, wherein step (b) comprises receiving a host integrated circuit card containing the first authorization information.

21. A process as claimed in claim 19, wherein step (d) comprises providing the content of the multimedia file to an audio output device.

22. A process as claimed in claim 19, wherein step (d) comprises providing the content of the multimedia file to a video output device.

23. A process as claimed in claim 19, wherein step (d) comprises providing the content of the multimedia file in electronic form to an output link.

* * * * *